(12) United States Patent
Hanada et al.

(10) Patent No.: US 10,224,724 B2
(45) Date of Patent: Mar. 5, 2019

(54) CHARGE/DISCHARGE MANAGEMENT DEVICE

(71) Applicant: TOSHIBA MITSUBISHI-ELECTRIC INDUSTRIAL SYSTEMS CORPORATION, Chuo-ku (JP)

(72) Inventors: Masato Hanada, Tokyo (JP); Daisuke Tsurumaru, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 67 days.

(21) Appl. No.: 15/516,507

(22) PCT Filed: Oct. 21, 2014

(86) PCT No.: PCT/JP2014/077973
§ 371 (c)(1),
(2) Date: Apr. 3, 2017

(87) PCT Pub. No.: WO2016/063351
PCT Pub. Date: Apr. 28, 2016

(65) Prior Publication Data
US 2018/0226812 A1    Aug. 9, 2018

(51) Int. Cl.
*H02J 7/00* (2006.01)
*H01M 10/48* (2006.01)
(Continued)

(52) U.S. Cl.
CPC ......... *H02J 7/0021* (2013.01); *H01M 10/425* (2013.01); *H01M 10/441* (2013.01);
(Continued)

(58) Field of Classification Search
CPC .................................................. H02J 7/0021
(Continued)

(56) References Cited

U.S. PATENT DOCUMENTS

| | | | | |
|---|---|---|---|---|
| 6,031,354 A | * | 2/2000 | Wiley | ............... G01R 31/3648 320/116 |
| 2010/0019718 A1 | * | 1/2010 | Salasoo | ................. B60L 3/0046 320/103 |

(Continued)

FOREIGN PATENT DOCUMENTS

| JP | 2001-231179 A | 8/2001 |
|---|---|---|
| JP | 2002-181906 A | 6/2002 |

(Continued)

OTHER PUBLICATIONS

International Search Report dated Dec. 16, 2014, in PCT/JP2014/077973, filed Oct. 21, 2014.
(Continued)

*Primary Examiner* — Suresh Memula
(74) *Attorney, Agent, or Firm* — Oblon, McClelland, Maier & Neustadt, L.L.P.

(57) ABSTRACT

A charge/discharge management device relating to the present invention is provided in equipment including a storage battery system. The storage battery system includes a plurality of PCS groups. Each of the PCS groups includes a storage battery, a BMU, and a PCS. The charge/discharge management device includes an operation time SOC calculation unit, a stop time SOC estimation unit, and an initial SOC resetting unit. The operation time SOC calculation unit calculates an operation time SOC for which an SOC based on an integrated value of a current value supplied from the BMU is added to an initial SOC of the storage battery, for each of the plurality of PCS groups. The stop time SOC estimation unit stops charge/discharge of the some group in the case that a stop condition is established, and thereafter, estimates a stop time SOC of the storage battery based on a voltage value supplied from the BMU for the some group. The initial SOC resetting unit resets the initial SOC that the (Continued)

operation time SOC calculation unit has with the stop time SOC, and resets the integrated value that the operation time SOC calculation unit has.

2 Claims, 4 Drawing Sheets

(51) Int. Cl.
| | |
|---|---|
| H02J 7/34 | (2006.01) |
| H01M 10/42 | (2006.01) |
| H01M 10/44 | (2006.01) |
| H01M 10/46 | (2006.01) |
| H02J 7/04 | (2006.01) |

(52) U.S. Cl.
CPC ........... *H01M 10/46* (2013.01); *H01M 10/48* (2013.01); *H01M 10/482* (2013.01); *H02J 7/00* (2013.01); *H02J 7/04* (2013.01); *H02J 7/34* (2013.01); *H01M 2010/4271* (2013.01)

(58) Field of Classification Search
USPC ......................................... 320/134
See application file for complete search history.

(56) References Cited

U.S. PATENT DOCUMENTS

| | | | | |
|---|---|---|---|---|
| 2010/0090650 A1* | 4/2010 | Yazami | ............... | H01M 10/443 320/132 |
| 2012/0074909 A1* | 3/2012 | Hondo | .................... | H02J 3/32 320/128 |
| 2012/0169291 A1 | 7/2012 | Abe et al. | | |
| 2013/0257351 A1* | 10/2013 | Nishibayashi | ............ | H02J 7/00 320/107 |
| 2014/0203783 A1* | 7/2014 | Kiesel | ................... | H01M 10/42 320/134 |
| 2014/0285156 A1* | 9/2014 | Mukaitani | .......... | G01R 31/3624 320/134 |
| 2015/0028816 A1* | 1/2015 | Lee | ....................... | H02J 7/0021 320/134 |

FOREIGN PATENT DOCUMENTS

| | | |
|---|---|---|
| JP | 2003-244854 A | 8/2003 |
| JP | 2009-11138 A | 1/2009 |
| JP | 2012-43623 A | 3/2012 |
| JP | 2012-96712 A | 5/2012 |
| JP | 2012-177588 A | 9/2012 |
| JP | 2012-205480 A | 10/2012 |
| JP | 2014-117003 A | 6/2014 |
| JP | 2014-124063 A | 7/2014 |
| WO | 2011/043172 A1 | 4/2011 |

OTHER PUBLICATIONS

Japanese Office Action dated Dec. 12, 2017 in Japanese Patent Application No. 2016-554980 (with English translation).

Office Action dated Jul. 3, 2018 in Japanese Patent Application No. 2016-554980 (with unedited computer generated English translation), 2 pages.

* cited by examiner

CHARGE/DISCHARGE MANAGEMENT DEVICE

FIELD

The present invention relates to a charge/discharge management device provided in equipment including a storage battery system.

BACKGROUND

A power system is constructed by connecting power generation equipment and load equipment by a power transmission facility. There are power systems in various scales from a large-scale system connecting a plurality of large-scale power plants and many factories, commercial facilities and households to a small-scale system constructed within a specific facility.

In-plant equipment provided in a plant such as a power plant or a factory includes, for example, a load system, a power generation system, and a storage battery system. The in-plant equipment is connected to a power system. The power system or the in-plant equipment includes an energy management system (EMS) that manages at least in-plant electric power supply/demand, and the electric power supply/demand of the individual systems and the power system is balanced by the energy management system.

One type of power generation systems utilizes natural energy such as sunlight and wind power. The power generation system utilizing the natural energy is being widely introduced in response to rise in awareness of energy problems or environmental problems in recent years. However, the power generation system utilizing the natural energy has a disadvantage that power cannot be stably supplied since generated power tends to be controlled by natural factors such as seasons and weather. In order to make up for the disadvantage, the equipment for which the power generation system and the storage battery system are combined is being considered.

The storage battery system is used as a means for stabilizing power supplied to a load system by the power generation system and the power system, or power supplied to the power system and the load system by the power generation system. It was thought before that it is difficult to store a large amount of power, however, since a storage battery of a large capacity such as a lithium-ion battery and sodium-sulfur battery is put into practical use, it is made possible to store the large amount of power. By connecting the storage battery system including such a storage battery to the power generation system, an operation is possible in which excess power is charged in the storage battery when supply is excessive in contrast with power demand, and power insufficiency is compensated by discharge from the storage battery when the supply is insufficient in contrast with the power demand. By combining the storage battery system with the power generation system utilizing the natural energy, the generated power that fluctuates depending on seasons and weather or the like is leveled by charge/discharge of the storage battery, and the power can be stably supplied to the power system.

Note that the applicant recognizes literatures described below as the ones associated with the present invention. JP 2014-117003 A discloses a configuration that a photovoltaic power generation system and a storage battery system are connected and fluctuation of generated power of photovoltaic power generation is suppressed by charge/discharge control of a storage battery. JP 2014-124063 A discloses one example of the storage battery system including a plurality of power conditioning systems (PCSes) connected to the power system. In addition, a configuration of managing SOCs (States Of Charge) of the plurality of storage batteries to be the same value is disclosed. JP 2012-43623 A discloses a configuration of calculating the SOC of the storage battery from an integrated value of a current flowing to the storage battery.

CITATION LIST

Patent Literature

[PTL 1] JP 2014-117003 A
[PTL 2] JP 2014-124063 A
[PTL 3] JP 2012-43623 A

SUMMARY

Technical Problem

As described above, in a storage battery system including a plurality of PCSes, in order to control the SOC of a storage battery to be the same value among the PCSes, it is needed to highly accurately calculate the SOC of each storage battery. As a calculation method of the SOC during charge/discharge, there is a method of calculating the SOC of the storage battery from an integrated value of a current flowing to the storage battery. However, since the charge/discharge is continuously performed without a break in the case of performing the charge/discharge at all times to the storage battery system (for example, in the case of being used for stabilization of power to be supplied to a power system or a load system), SOC re-computation timing by charge/discharge stop cannot be obtained. When the above-described method of calculating the SOC from the integrated value of the current is continued, there is a problem that an error due to detection accuracy of a sensor and charge/discharge loss or the like is integrated and cumulatively becomes large, and the error of the calculated SOC also becomes large.

The present invention is implemented in order to solve the above-described problem, and an object is to provide a charge/discharge management device capable of continuing to highly accurately calculate the SOC of the storage battery.

Solution to Problem

In order to achieve the above-described object, in-plant equipment provided with a charge/discharge management device relating to an embodiment of the present invention is configured as follows.

The charge/discharge management device relating to the embodiment of the present invention is provided in the in-plant equipment including a storage battery system connected to an intra-equipment electric wire. The in-plant equipment is equipment arranged inside a plant such as a power plant or a factory. The in-plant equipment may include a power generation system and a load system connected to the storage battery system through the intra-equipment electric wire. The intra-equipment electric wire is connected to a power system.

An energy management system determines and outputs a charge/discharge request so as to balance electric power supply/demand of the individual systems and the power system described above. The charge/discharge management device relating to the present invention transmits a charge/discharge command to the storage battery system on the basis of the charge/discharge request from the energy management system. The charge/discharge management device relating to the embodiment of the present invention may be arranged inside the energy management system or the storage battery system. A scale and a configuration of the in-plant equipment and the power system are not limited. For example, both or either one of the power generation system and the load system may be connected to the in-plant equipment.

The storage battery system includes a plurality of PCS groups. Each PCS group includes a storage battery, battery management unit, and a power conditioning system.

The storage battery may be configured by a single storage battery cell or may be configured as an assembly of a plurality of storage battery cells. As a kind of the storage battery, the storage battery of a large capacity such as a lithium-ion battery, a sodium-sulfur battery or a nickel-hydrogen battery is preferable.

The battery management unit is a device that monitors a state of the storage battery. Examples of monitoring items by the battery management unit are state amounts of a current, a voltage and a temperature or the like. The battery management unit measures the state amount which is the monitoring item at all times or in a predetermined cycle by a sensor, and outputs a part or all of obtained data to outside as storage battery information.

The power conditioning system is a device that connects the storage battery to an intra-equipment electric wire, and has a function of converting AC power outputted to the intra-equipment electric wire to DC power and charging the DC power to the storage battery and a function of converting the DC power of the storage battery to the AC power and discharging the AC power to the intra-equipment electric wire. The power conditioning system is also referred to as a power conditioner, and a charge power amount to the storage battery and a discharge power amount from the storage battery are adjusted by the power conditioning system.

The charge/discharge management device relating to the embodiment of the present invention is connected to the power conditioning system and the battery management unit of each of the plurality of PCS groups. The charge/discharge management device includes an operation time SOC calculation unit, a stop condition determination unit, a stop time SOC estimation unit, an initial SOC resetting unit, and a charge/discharge command unit.

The operation time SOC calculation unit calculates an operation time SOC for which an SOC based on the integrated value of a current value supplied from the battery management unit is added to an initial SOC of the storage battery, for each of the plurality of PCS groups.

The stop condition determination unit determines whether or not a stop condition is established. Here, the stop condition is that, even when the charge/discharge of some group of the plurality of PCS groups is stopped, a total charge/discharge possible amount based on the operation time SOC of the other groups is larger than a charge/discharge request amount requested from the energy management system. The charge/discharge request amount is included in the charge/discharge request outputted from the energy management system.

The stop time SOC estimation unit stops the charge/discharge of some group described above in the case that the stop condition is established, and hereafter, estimates a stop time SOC of the storage battery on the basis of a voltage value supplied from the battery management unit for the some group.

The initial SOC resetting unit resets the initial SOC that the operation time SOC calculation unit has with the stop time SOC, and resets the integrated value that the operation time SOC calculation unit has to 0, for the some group.

In a preferable form of the storage battery system relating to the embodiment of the present invention, the charge/discharge command unit proportionately divides the charge/discharge request amount requested from the energy management system, and determines the charge/discharge command for the plurality of PCS groups. In addition, the charge/discharge command unit proportionately divides the charge/discharge request amount by the other groups and determines the charge/discharge command for the other groups, in the case that the stop condition is established.

Advantageous Effects of Invention

According to the charge/discharge management device relating to the embodiment of the present invention, for the some group, the initial SOC that the operation time SOC calculation unit has is reset with the stop time SOC and the integrated value is reset to 0. As a result, the current operation time SOC is replaced with the highly accurate stop time SOC, and a cumulative error due to the detection accuracy of the sensor and the charge/discharge loss is eliminated. Thereafter, the operation time SOC can be calculated on the basis of the new initial SOC. Then, by periodically replacing the operation time SOC with the stop time SOC, calculation accuracy of the operation time SOC can be recovered. Therefore, according to the charge/discharge management device relating to the embodiment of the present invention, by forcibly stopping the charge/discharge to some storage batteries successively at a fixed interval, the SOC of the storage battery can be highly accurately calculated continuously.

DESCRIPTION OF EMBODIMENTS

Hereinafter, an embodiment of the present invention will be described in details with reference to the drawings. Note that same signs are attached to elements in common in the respective diagrams and redundant descriptions are omitted.
Embodiment 1.
[System Configuration of Embodiment 1]

Figure 1:
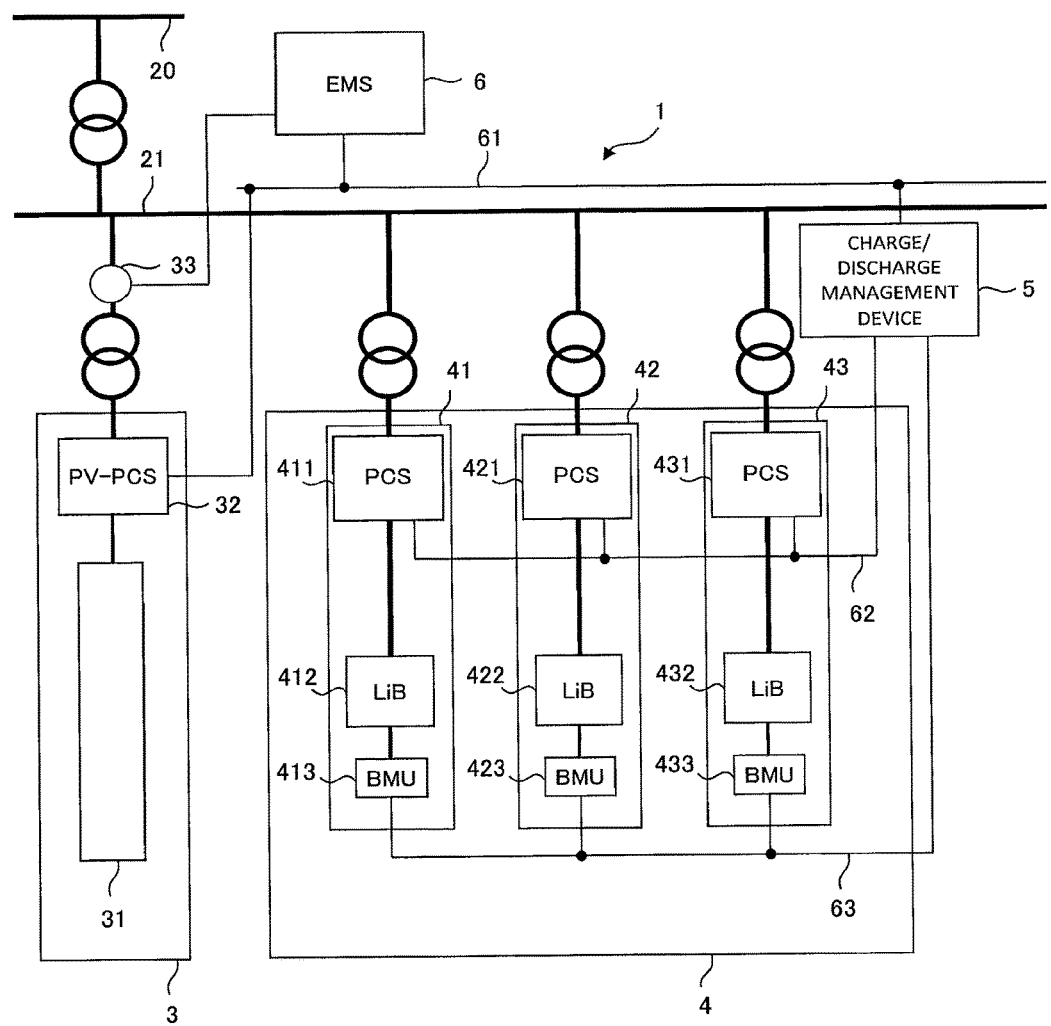
FIG. 1 is a conceptual configuration diagram for describing a system configuration relating to an embodiment 1 of the present invention.

FIG. 1 is a conceptual configuration diagram for describing a system configuration relating to the embodiment 1 of the present invention. In-plant equipment 1 illustrated in FIG. 1 is connected to a power transmission facility 20 of a power system. In the power system, other than the power transmission facility 20, power generation equipment (omitted in the figure) and load equipment (omitted in the figure) may be connected to the power transmission facility 20.

The intra-plant equipment 1 illustrated in FIG. 1 includes a power generation system 3 and a storage battery system 4. The power generation system 3, the storage battery system 4 and the power system are connected through an intra-equipment electric wire 21. Further, the intra-plant equipment 1 includes a charge/discharge management device 5 and an energy management system (hereinafter, EMS) 6. The power generation system 3, the storage battery system 4, the charge/discharge management device 5 and the EMS 6 are connected through a computer network 61.

(Power Generation System)

The power generation system 3 illustrated in FIG. 1 is a photovoltaic power generation (PV) system. Note that the power generation system 3 may be a wind power generation system, a hydraulic power generation system, a tidal power generation system, a geothermal power generation system, or the like. The power generation system 3 includes a photovoltaic power generation module 31, and a power conditioning system for photovoltaic power generation (hereinafter, PV-PCS) 32. In the power generation system 3, the PV-PCS 32 is connected to at least one photovoltaic power generation module 31. The PV-PCS 32 is connected to the intra-equipment electric wire 21 through a power meter 33. In FIG. 1, the power meter 33 is arranged between the power generation system 3 and the intra-equipment electric wire 21, but it is just one example. The power meter 33 may be incorporated in the power generation system 3. The power meter 33 is connected to the EMS 6 by a signal line.

The power meter 33 detects generated power supplied from the power generation system 3 to the intra-equipment electric wire 21 regularly. However, regular detection in the present embodiment is a concept including not only an operation of fetching continuous signals without an interval from a sensor but also an operation of fetching signals of the sensor in a predetermined short cycle. A generated power value detected in the power meter 33 is inputted to the EMS 6.

(Storage Battery System)

The storage battery system 4 includes a plurality of power conditioning systems (hereinafter, PCSes) for the storage battery. Hereinafter, in order to facilitate descriptions, a group configured by one PCS, the storage battery connected to the PCS and a battery management unit (hereinafter, BMU) is referred to as a "PCS group".

A first PCS group 41 includes a first PCS 411, a first storage battery 412, and a first BMU 413. A second PCS group 42 includes a second PCS 421, a second storage battery 422, and a second BMU 423. A third PCS group 43 includes a third PCS 431, a third storage battery 432, and a third BMU 433. Since basic configurations of the individual PCS groups are similar, here, the first PCS group 41 is exemplified and described. Note that, in FIG. 1, three PCS groups are plotted, however, there may be just the plurality of PCS groups.

Regarding the first PCS group 41, the first PCS 411 is connected to the first storage battery 412. The first storage battery 412 is connected to the first BMU 413. The first BMU 413 is connected to the charge/discharge management device 5 by a computer network 63.

The first PCS 411 is connected to the intra-equipment electric wire 21 by a power transmission line through a transformer. The first PCS 411 has a charge function of converting AC power outputted by the power generation system 3 to the intra-equipment electric wire 21 to DC power and charging the DC power to the first storage battery 412, and a discharge function of converting the DC power of the first storage battery 412 to the AC power and discharging the AC power to the power system. A charge power amount to the first storage battery 412 and a discharge power amount from the first storage battery 412 are adjusted by the first PCS 411. The charge/discharge power amounts are adjusted by the first PCS 411 according to charge/discharge commands supplied from the charge/discharge management device 5.

The first storage battery 412 includes a module for which a plurality of cells are connected in series. The plurality of modules may be connected in parallel. Each cell is a lithium-ion battery (LiB).

The first BMU 413 monitors a state of the first storage battery 412. Specifically, the BMU 413 includes a current sensor, a voltage sensor, and a temperature sensor as means for measuring a state amount of the first storage battery 412. A current flowing to the first storage battery 412 is measured by the current sensor. A voltage of each cell is measured by the voltage sensor. And, a temperature of the first storage battery 412 is measured by the temperature sensor. The first storage battery 412 is regularly monitored by the first BMU 413. However, regular monitoring in the present embodiment is the concept including not only the operation of fetching the continuous signals without an interval from the sensor but also the operation of fetching the signals of the sensor in a predetermined short cycle. The first BMU 413 transmits storage battery information including information obtained by measurements by the respective sensors to the charge/discharge management device 5.

The first PCS 411, the first storage battery 412 and the first BMU 413 of the first PCS group 41 are described above, and the above-described basic configuration is similar also for the second PCS group 42 and the third PCS group 43.

(Energy Management System (EMS))

The EMS 6 includes a memory including a ROM and a RAM or the like for example, an input/output interface that inputs and outputs various kinds of information, and a processor capable of executing various kinds of arithmetic processing on the basis of the various kinds of information. The EMS 6 is connected to the charge/discharge management device 5 through the computer network 61. The EMS 6 manages at least in-plant electric power supply/demand. For example, the EMS 6 determines the charge/discharge request to the storage battery system 4 so as to balance the electric power supply/demand of the power system, the power generation system 3 and the storage battery system 4. The charge/discharge request is transmitted to the charge/discharge management device 5. Now, in the system configuration illustrated in FIG. 1, the intra-plant equipment 1 includes the power generation system 3, however, the configuration of the intra-plant equipment 1 is not limited thereto. A load system may be provided instead of the power generation system 3, or the load system connected to the intra-equipment electric wire 21 may be provided together with the power generation system 3. In such a configuration, the EMS 6 determines the charge/discharge request to the storage battery system 4 so as to balance the electric power supply/demand of the power system, the power generation system 3, the storage battery system 4 and the load system.

(Charge/Discharge Management Device)

The charge/discharge management device 5 includes a memory including a ROM and a RAM or the like for example, an input/output interface that inputs and outputs various kinds of information, and a processor capable of executing various kinds of arithmetic processing on the basis of the various kinds of information. The charge/discharge management device 5 is connected to the EMS 6 and the PV-PCS 32 by the computer network 61. The charge/discharge management device 5 is connected to the first PCS 411, the second PCS 421, and the third PCS 431 by a computer network 62. The charge/discharge management device 5 is connected to the first BMU 413, the second BMU 423, and the third BMU 433 by the computer network 63. Note that, in FIG. 1, the charge/discharge management device 5 is arranged outside the storage battery system 4, however, it may be arranged inside the storage battery system 4 or the EMS 6.

The charge/discharge management device 5 has various kinds of functions to be described later, and plays a role of a controller that issues the charge/discharge command (corresponding to the charge/discharge amount [kW]) to the first PCS 411 to the third PCS 431 on the basis of the charge/discharge request received from the EMS 6. In addition, the charge/discharge management device 5 has a PV-PCS output suppression function of suppressing output of the power generation system 3 in the case that the storage battery is in a full charge state.

[Characteristic Configuration of Embodiment 1]

Figure 2:
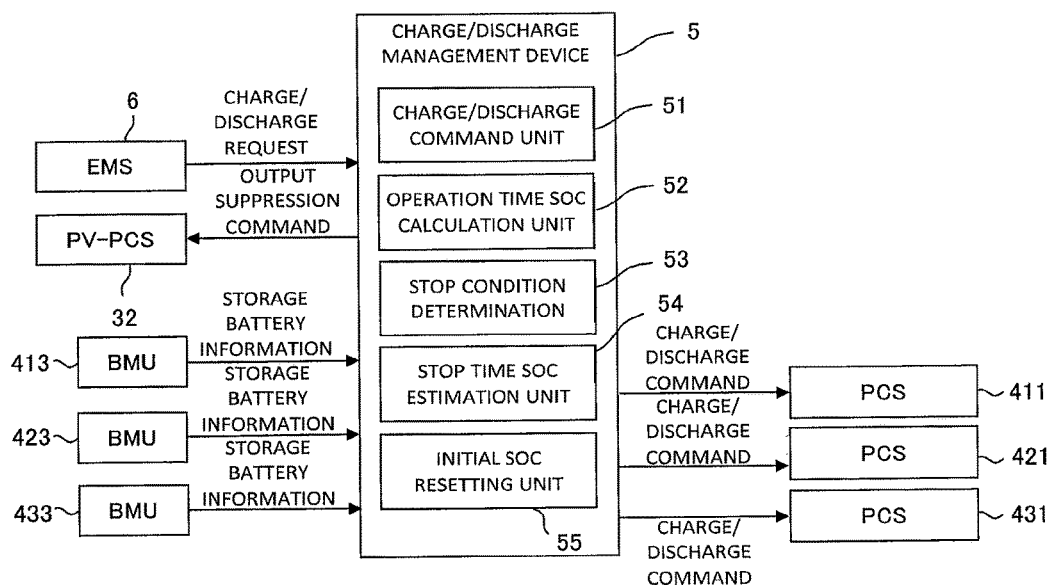
FIG. 2 is a block diagram of a system relating to the embodiment 1 of the present invention.

FIG. 2 is a block diagram of a system relating to the embodiment 1 of the present invention.

Inside a block indicating the charge/discharge management device 5, a part of various functions that the charge/discharge management device 5 has is expressed by a block. An arithmetic resource is allocated to each of the blocks. Programs corresponding to the respective blocks are prepared in the charge/discharge management device 5, and by executing them by the processor, the functions of the respective blocks are realized in the charge/discharge management device 5.

(Operation Time SOC Calculation Function)

The charge/discharge management device 5 has an operation time SOC calculation function, and an operation time SOC calculation unit 52 is in charge of the function. The SOC of the storage battery during charge/discharge can be estimated from the integrated value of the current flowing to the storage battery. The operation time SOC calculation unit 52 calculates the operation time SOC for which the SOC based on the integrated value of a current value supplied from the first BMU 413 is added to an initial SOC of the first storage battery 412, for the first PCS group 41. An initial value of the initial SOC is 0, however, it is updated by an initial SOC resetting unit to be described later. Similarly, the operation time SOC calculation unit 52 also calculates the operation time SOC respectively for the second PCS group 42 and the third PCS group 43.

(Stop Condition Determination Function)

The charge/discharge management device 5 has a stop condition determination function, and a stop condition determination unit 53 is in charge of the function. The stop condition determination unit 53 determines whether or not a stop condition is established. Here, the stop condition is that, even when the charge/discharge of some group of the first PCS group 41 to the third PCS group 43 is stopped, a total charge/discharge possible amount based on the operation time SOC of the other groups is larger than the charge/discharge request amount requested from the EMS 6. As one example, when "some group" described above is the first PCS group 41, "the other groups" described above is the second PCS group 42 and the third PCS group 43. In this case, the total charge/discharge possible amount is determined according to the total of the operation SOC of the second PCS group 42 and the third PCS group 43. The charge/discharge request amount is included in the charge/discharge request outputted from the EMS 6.

(Stop Time SOC Estimation Function)

The charge/discharge management device 5 has a stop time SOC estimation function, and a stop time SOC estimation unit 54 is in charge of the function. In the case that the above-described stop condition is established, the stop time SOC estimation unit 54 stops the charge/discharge of the some group, and thereafter, estimates the stop time SOC of the storage battery on the basis of a voltage value supplied from the BMU for the some group. As one example, in the case that "some group" described above is the first PCS group 41, the stop time SOC estimation unit 54 determines the charge/discharge command to turn the charge/discharge amount to 0 for the first PCS group 41. The charge/discharge command is transmitted to the first PCS group 41 by the charge/discharge management device 5. The stop time SOC estimation unit 54 estimates the stop time SOC of the first storage battery 412 from the voltage value supplied from the first BMU 413, after the charge/discharge of the first PCS group 41 is stopped. When estimating the stop time SOC, a map or an equation indicating a relation between the voltage and the SOC illustrated in FIG. 3 can be used.

Figure 3:
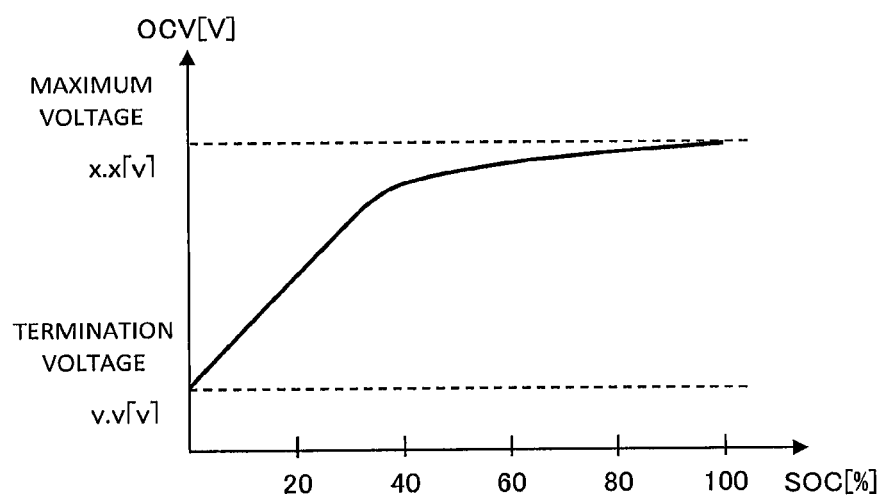
FIG. 3 is a graph illustrating a relation between an OCV (closed circuit voltage) of a lithium-ion battery and the SOC.

FIG. 3 is a graph illustrating a relation between an OCV (closed circuit voltage) and the SOC of a lithium-ion battery. In the present embodiment, the SOC means a charge rate to full charge. As can be recognized from the graph, the lithium-ion battery has a characteristic that the voltage is higher as it is fully charged and the voltage becomes lower as it is nearly empty. By utilizing the voltage-SOC characteristic, the SOC can be estimated from a measured value of the voltage. The voltage in the present embodiment means the voltage applied to both ends of the storage battery.

(Initial SOC Resetting Function)

The charge/discharge management device 5 has an initial SOC resetting function, and an initial SOC resetting unit 55 is in charge of the function. The initial SOC resetting unit 55 resets the initial SOC that the operation time SOC calculation unit 52 has with the stop time SOC, and resets the integrated value that the operation time SOC calculation unit 52 has to 0, for the above-described some group.

In this way, for the some group, the initial SOC that the operation time SOC calculation unit 52 has is reset with the stop time SOC and the integrated value is reset to 0. As a result, for the above-described some group, the current operation time SOC is replaced with the highly accurate stop time SOC, and a cumulative error due to the detection accuracy of the sensor and the charge/discharge loss is eliminated. Thereafter, the operation time SOC can be calculated on the basis of the new initial SOC. Therefore, according to the system of the present embodiment, by periodically replacing the operation time SOC with the stop time SOC, calculation accuracy of the operation time SOC can be recovered. Therefore, the SOC of the storage battery can be highly accurately calculated continuously.

(Charge/Discharge Command Function)

The charge/discharge management device 5 has a charge/discharge command function, and a charge/discharge command unit 51 is in charge of the function. The charge/discharge command unit 51 proportionately divides the charge/discharge request amount requested from the EMS 6, and determines the charge/discharge command for the first PCS group 41 to the third PCS group 43. Further, in the case that the stop condition is established, the charge/discharge command unit 51 proportionately divides the charge/discharge request amount by the other groups, and determines the charge/discharge command for the other groups. As one example, in the case that "the other groups" described above is the second PCS group 42 and the third PCS group 43, the charge/discharge command for which the charge/discharge request amount is divided by the two PCS groups is determined.

(Flowchart)

Figure 4:
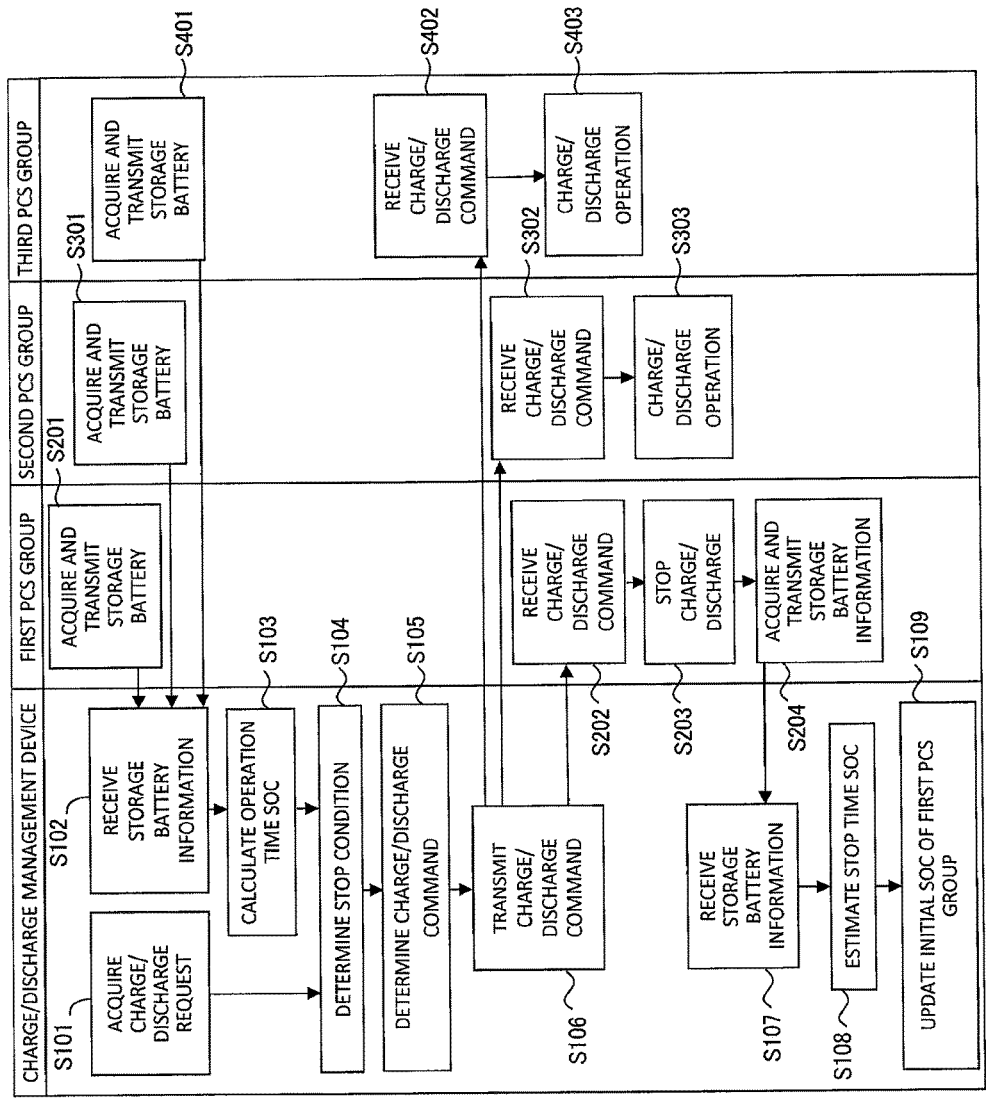
FIG. 4 is a flowchart of a control routine executed by a storage battery system 4 and a charge/discharge management device 5, in the system relating to the embodiment 1 of the present invention.

FIG. 4 is a flowchart of a control routine executed by the storage battery system 4 and the charge/discharge management device 5, in the system relating to the embodiment 1 of the present invention. Processing of the charge/discharge management device 5 illustrated in the flowchart is the processing realized by the individual functions of the charge/discharge command unit 51, the operation time SOC calculation unit 52, the stop condition determination unit 53, the stop time SOC estimation unit 54, and the initial SOC resetting unit 55. The program that executes the processing in the flowchart illustrated in FIG. 4 is stored in the memory of the charge/discharge management device 5, and by reading and executing the program by the processor of the charge/discharge management device 5, the processing illustrated in FIG. 4 is realized.

In the routine illustrated in FIG. 4, the charge/discharge management device 5 acquires the charge/discharge request from the EMS 6 in a predetermined short cycle (step S101).

In the first PCS group 41, the first BMU 413 regularly acquires storage battery information using the various kinds of sensors. The storage battery information includes the current flowing to the first storage battery 412, the voltage of the first storage battery 412, and the temperature of the first storage battery 412. Thereafter, the first BMU 413 transmits the acquired storage battery information to the charge/discharge management device 5 (step S201).

In the second PCS group 42, the second BMU 423 regularly acquires the storage battery information using the various kinds of sensors. The storage battery information includes the current flowing to the second storage battery 422, the voltage of the second storage battery 422, and the temperature of the second storage battery 422. Thereafter, the second BMU 423 transmits the acquired storage battery information to the charge/discharge management device 5 (step S301).

In the third PCS group 43, the third BMU 433 regularly acquires the storage battery information using the various kinds of sensors. The storage battery information includes the current flowing to the third storage battery 432, the voltage of the third storage battery 432, and the temperature of the third storage battery 432. Thereafter, the third BMU 433 transmits the acquired storage battery information to the charge/discharge management device 5 (step S401).

The charge/discharge management device 5 receives the storage battery information transmitted from the first BMU 413 to the third BMU 433 (step S102).

Next, the charge/discharge management device 5 calculates the operation time SOC for each of the first PCS group 41 to the third PCS group 43, on the basis of each storage battery information received in step S102 (step S103). Processing content of step S103 is as described in the description of the operation time SOC calculation function.

Next, the charge/discharge management device 5 determines whether or not the stop condition is established (step S104). Processing content of step S104 is as described in the description of the stop condition determination function. In the case that the stop condition is established, the processing of step S104 is executed. In the case that the stop condition is not established, the routine is ended, and the routine is started again after the lapse of predetermined time.

Note that, in the following description, as one example, it is assumed that the stop condition is that, even when the charge/discharge of the first PCS group 41 is stopped, the total charge/discharge possible amount based on the total of the operation SOC of the second PCS group 42 and the third PCS group 43 is larger than the charge/discharge request amount requested from the EMS 6.

When the stop condition is established, the charge/discharge management device 5 determines the charge/discharge command to turn the charge/discharge amount to 0 for the first PCS group 41. The processing content is as described as a part of the description of the stop time SOC estimation function (step S105). Further, in step S105, the charge/discharge management device 5 proportionately divides the charge/discharge request amount by the second PCS group 42 and the third PCS group 43, and determines the charge/discharge commands for the second PCS group 42 and the third PCS group 43. The processing content is as described as a part of the description of the charge/discharge command function.

Next, the charge/discharge management device 5 transmits the charge/discharge command for the first PCS group 41 to the first PCS 411, the charge/discharge command for the second PCS group 42 to the second PCS 421, and the charge/discharge command for the third PCS group 43 to the third PCS 431 (step S106).

In the second PCS group 42, the second PCS 421 receives the charge/discharge command transmitted from the charge/discharge management device 5 (step S302). The second PCS 421 executes a charge/discharge operation according to the charge/discharge command (step S303).

In the third PCS group 43, the third PCS 431 receives the charge/discharge command transmitted from the charge/discharge management device 5 (step S402). The third PCS 431 executes the charge/discharge operation according to the charge/discharge command (step S403).

In the first PCS group 41, the first PCS 411 receives the charge/discharge command transmitted from the charge/discharge management device 5 (step S202). The first PCS 411 executes the charge/discharge operation according to the charge/discharge command. Since the charge/discharge command for the first PCS 411 is the command to turn the charge/discharge amount to 0, the charge/discharge of the first PCS group 41 is stopped (step S203).

The first BMU 413 transmits the storage battery information acquired after the charge/discharge of the first PCS group 41 is stopped to the charge/discharge management device 5 (step S204).

The charge/discharge management device 5 receives the storage battery information transmitted from the first BMU 413 (step S107).

Next, the charge/discharge management device 5 estimates the stop time SOC of the first storage battery 412 from the voltage value included in the storage battery information received from the first BMU 413 (step S108). The processing content of step S108 is as described in the description of the stop time SOC estimation function.

Then, the charge/discharge management device 5 resets the initial SOC that the operation time SOC calculation unit 52 has with the stop time SOC, and resets the integrated value that the operation time SOC calculation unit 52 has to 0, for the first PCS group 41 (step S109). Thus, the current operation time SOC is replaced with the highly accurate stop time SOC, and the cumulative error due to the detection accuracy of the sensor and the charge/discharge loss is eliminated. Thereafter, the operation time SOC can be calculated on the basis of the new initial SOC.

As described above, according to the system of the present embodiment, by periodically replacing the operation time SOC with the stop time SOC, the calculation accuracy of the operation time SOC can be recovered. Therefore, the SOC of the storage battery can be highly accurately calculated continuously.

Now, in the system of the embodiment 1 described above, the lithium-ion battery is used as the storage battery, and it is not limited thereto. As a kind of the storage battery, the storage battery may be a sodium-sulfur battery or a nickel-hydrogen battery or the like.

REFERENCE SIGNS LIST

1 In-plant equipment
3 Power generation system
4 Storage battery system
5 Charge/discharge management device
6 Energy management system (EMS)
20 Power transmission facility
21 Intra-equipment electric wire
31 Photovoltaic power generation module
32 PV-PCS
33 Power meter
41 First PCS group
42 Second PCS group
43 Third PCS group
51 Charge/discharge command unit
52 Operation time SOC calculation unit
53 Stop condition determination unit
54 Stop time SOC estimation unit
55 Initial SOC resetting unit
61, 62, 63 Computer network
411 First PCS
412 First storage battery
413 First BMU
421 Second PCS
422 Second storage battery
423 Second BMU
431 Third PCS
432 Third storage battery
433 Third BMU

The invention claimed is:

1. A charge/discharge management device provided in in-plant equipment including a storage battery system connected to an intra-equipment electric wire, and transmitting a charge/discharge command to the storage battery system based on a charge/discharge request from an energy management system managing at least in-plant electric power supply/demand,
wherein the storage battery system includes a plurality of PCS groups, and
wherein each of the PCS groups includes
a storage battery,
a battery management unit that monitors a state of the storage battery, and
a power conditioning system having a function of converting AC power outputted to the intra-equipment electric wire to DC power and charging the DC power to the storage battery, and a function of converting the DC power of the storage battery to the AC power and discharging the AC power to the intra-equipment electric wire,
the charge/discharge management device comprising:
an operation time SOC calculation unit that calculates an operation time SOC for which an SOC based on an integrated value of a current value supplied from the battery management unit is added to an initial SOC of the storage battery, for each of the plurality of PCS groups;
a stop condition determination unit that defines a condition that, even when charge/discharge of some group of the plurality of PCS groups is stopped, a total charge/discharge possible amount based on the operation time SOC of groups of PCS groups other than the some group is larger than a charge/discharge request amount requested from the energy management system as a stop condition, and determines whether or not the stop condition is established;
a stop time SOC estimation unit that stops the charge/discharge of the some group in the case that the stop condition is established, and thereafter, estimates a stop time SOC of the storage battery based on a voltage value supplied from the battery management unit for the some group; and
an initial SOC resetting unit that resets the initial SOC with the stop time SOC, and resets the integrated value, for the some particular group.

2. The charge/discharge management device according to claim 1, further comprising
a charge/discharge command unit that proportionately divides the charge/discharge request amount by the other groups and determines charge/discharge commands for the other groups, in the case that the stop condition is established.

* * * * *